Patented Dec. 24, 1935

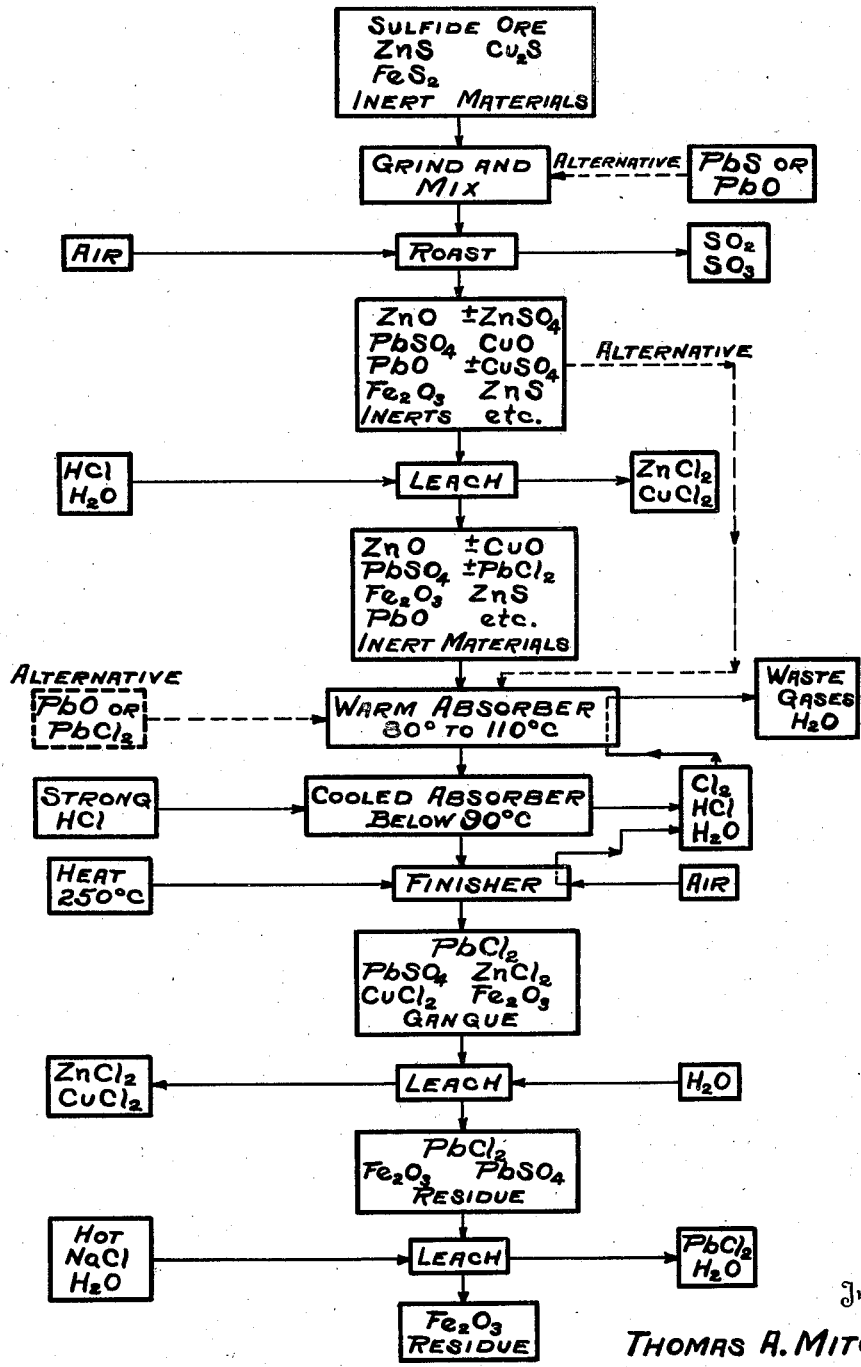

2,025,068

UNITED STATES PATENT OFFICE 2,025,068

METHOD OF TREATING SULPHIDE ORES

Thomas A. Mitchell, Denver, Colo., assignor, by mesne assignments, to Hughes-Mitchell Processes, Incorporated, Denver, Colo., a corporation of Wyoming Application November 17, 1933, Serial No. 698,551

17 Claims. (Cl. 75—67)

This invention relates to the chloridization of sulphide ores, and particularly of ores containing zinc sulphide, whether simple or complex in their nature.

When the sulphides of zinc, copper and similarly acting metals are roasted under standard low temperature oxidizing conditions, the zinc or other ore metal tends to form both the oxide and the sulphate. Residual sulphides are also left in the ore. Consequently, when an attempt is made later to chloridize the roasted product, such as by treatment with hydrochloric acid, chlorine and other suitable reagents, the sulphur trioxides or sulphate radical which may be present or formed during the chloridizing operation tends to displace chlorine and to leave the zinc partly in the form of a sulphate, so that the resultant solution leached from the ore contains both the chloride and the sulphate of the desired ore metal.

As described in my prior Patents Nos. 1,943,331 and 1,943,341 dated January 16, 1934, I have proposed heretofore to roast and/or to chloridize a sulphide ore with an alkaline earth metal oxide, hydroxide, carbonate or other alkaline earth material which is capable of and is proportioned for fixing the available sulphate radical as an insoluble alkaline earth metal sulphate and preventing the formation of the sulphate of zinc and similar ore metals.

It is the purpose of this invention to prevent the formation of the objectionable sulphates by taking advantage of the fact that lead has a strong affinity for the sulphate radical and preferentially tends to form lead sulphate by combination with the available sulphate radical during the operations of roasting and chloridizing an ore containing an ore metal sulphide. Also, since lead sulphate is highly insoluble, it will precipitate out of a solution containing lead, zinc, chlorine and sulphate ions, and thus compel the zinc to remain as zinc chloride. Hence, I propose to utilize compounds of lead as a substitute for the alkaline earth material, but otherwise employ such features of my prior processes as are pertinent to the present case.

It is, therefore, one object of this invention to provide a process of roasting various sulphide ores, in which compounds of lead are employed to prevent the formation of sulphates of the desired ore metals.

A further object is to provide a simple and efficient method of chloridizing an ore containing zinc, copper or similarly acting sulphides so as to produce the ore metal chloride substantially free from its sulphate. Further objects will be apparent in the following disclosure.

Although various types of chloridizing processes may be employed within the scope of this invention and the following disclosure, I prefer to chloridize an ore, whether complex or simple in its nature, or rich or lean, and particularly a complex zinc sulphide ore, in accordance with the method and by the apparatus disclosed and claimed in my prior Patent No. 1,979,281 dated November 6, 1934. In that process a sulphide ore is first roasted with air to burn off a considerable portion of the sulphide sulphur, after which the ore is chloridized, preferably by means of gases containing chlorine and/or hydrochloric acid, which will convert ore metal oxides in the roast to the chlorides. After this preliminary treatment, the residual sulphides, sulphates, ferrates, ferrites, silicates and other difficultly chloridized or refractory compounds are subjected to the action of nascent chlorine or to direct reaction with ferric chloride for the purpose of chloridizing the same. In the preferred process, the ferric chloride is formed in the presence of the ore material from ferric oxide contained therein, after which the ore is heated with air to a temperature at which the ferric chloride is not stable and nascent chlorine is developed therefrom. The process herein claimed may, however, involve various other procedures capable of accomplishing the desired chloridization, as hereinafter described.

The accompanying drawing illustrates diagrammatically the main steps of my preferred method of treating a zinc sulphide concentrate having the following analysis:

|  | Percent by weight |
|---|---|
| Zinc | 60 |
| Sulphur | 32 |
| Copper | 1 |
| Lead | 1 |
| Iron | 4 |
| Quartz | 2 |

If this sulphide ore were roasted by a standard roasting operation, and under low temperature and substantially autogenous conditions, whereby the sulphide sulphur merely burns off as sulphur dioxide, the zinc and copper would be present as both sulphates and oxides. In accordance with the present invention, I propose to mix the zinc sulphide concentrate with a suitable quantity of lead sulphide concentrate, or other suitable lead compound, such as lead oxide, which is so proportioned, as hereinafter explained, as to provide enough lead to fix all or a considerable part of the available sulphate radical as the insoluble lead sulphate and so prevent or hinder other ore metals from appearing as sulphates. For the above described ore, I may use about 20% by weight of lead sulphide concentrates. This mixture may be roasted by standard roasting procedure, or as herein described, in which the material is heated with air in a suitable furnace, such as one of the wedge type, and preferably under conditions which result in the sulphide of the ore burning autogenously. As a result, zinc, iron and copper will roast to the oxide form, while the lead will form lead sulphate and oxide.

In order that the roasting operation may be carried on satisfactorily, the ore material may be initially crushed to a finely divided condition, and preferably one which will pass through a screen of 100 meshes or more to the linear inch, so that the ore particles may be thoroughly exposed to the roasting gases and the lead oxide or sulphide is intimately associated with the values of the ore. Upon roasting this mixture, part of the lead sulphide preferentially goes to the sulphate form, but sufficient lead oxide is formed, or is preliminarily added for the purpose, so that the lead will serve to take up available sulphur trioxide and hinder its reaction, to a large extent, with the copper and zinc oxides. It is to be understood that the sulphur dioxide gases formed by burning the sulphides in air are oxidized in part to sulphur trioxide, due to the catalytic action of ferric oxide present or to other causes. There is, however, only a limited amount of sulphur trioxide, and that portion which is available to be taken up by lead will, of course, not form the sulphate of zinc, copper or other such metal. Consequently, the lead acts in a protective capacity to hinder the formation of the undesired sulphates of the ore metals.

The various conditions of the roasting process will be suitably controlled in accordance with standard practice, in order to prevent sintering or fusion of the ore material and to keep it in a substantially pulverulent or friable and porous structure which may be easily permeated by gases and liquids employed during the process. If the temperature is kept as low as is suitable for the burning of the sulphides autogenously, the danger of sintering is largely obviated. Such expedients as agitating the material during the roasting operation will materially aid, but the principal requirement is to so control the temperature that sintering or fusion does not result. This control may be effected in accordance with standard practice, as by regulating the proportions of the ingredients and their rate of travel through the roasting chamber and by the aid of heating or cooling mediums. The presence of finely divided inert materials aids in obtaining the desired result. The presence or addition of a considerable amount of iron oxide or its formation in situ from iron sulphide added to or present in the ore serves effectively in keeping the ore particles separated and in an unsintered, gas-permeable condition. This procedure, therefore, contemplates the addition or presence of sufficient inert material or one which can remain in a pulverulent condition during the roasting operation.

In order to determine the amount of lead which should be present, the original ore and the roasted product, or the final chloridized product, should be tested, as by a small scale laboratory apparatus, and analyzed to find how much lead sulphide or lead oxide is required for protecting the zinc or other metals which are to be obtained as oxides. It is desirable that the lead be present in amount in considerable excess over that which is the molecular equivalent of the sulphates of zinc and copper that tend to form, and in particular because a large portion of the lead sulphide roasts directly to lead sulphate, which does not serve in the required protective capacity. Hence, the proportions as well as the nature of the roasting operation should be so controlled that enough lead oxide is formed to take up all of the available sulphate radical. It is to be understood that such sulphur trioxide as well as the sulphur dioxide formed during the roasting operation, which escapes from the reaction zone as a gas, is not to be considered as available sulphate radical. Also, that portion of the sulphide sulphur which goes directly to the formation of lead sulphate by roasting of the lead sulphide need not be considered as available for making the sulphate of zinc, copper and the like. The available sulphate radical is that portion of the sulphur trioxide or combined sulphate radical which would tend to form the sulphate of the zinc, copper or other metal in the absence of the protective lead compound. If analysis of the roasted product shows undesired sulphate present, then the amount of lead oxide to be formed or added will be increased to the required extent, as will be readily understood by one skilled in the art.

The roasted product contains zinc, lead, iron and copper oxides, together with lead sulphate, which contains all or the major portion of the sulphate radical present in the roasted material. The oxides of the zinc, copper and other recoverable metals may be dissolved from the roasted product by means of dilute hydrochloric acid, which is preferably employed in such an amount that a portion of the zinc oxide is left in the roasted material. In this way, I may obtain a chloride solution which is substantially free from the sulphate of the solubilized metal as well as iron chloride. During this leaching process, the zinc oxide will be converted directly to a chloride, and such zinc sulphate as is present in the roasted product will be transposed to zinc chloride by the lead oxide or lead chloride which is formed during the leaching operation. Copper oxide will go into solution similarly, and the formation of copper sulfate will be prevented. Owing to the insolubility of lead chloride in the cold leaching solution, the resultant solution will be free from lead. In this way, the sulphate ion which is present will be taken up by the lead as the insoluble lead sulphate. Consequently, the lead oxide formed during the roasting operation is caused to act in a further protective capacity and to remove from combination with the zinc or copper such sulphate radical as has been combined therewith during the roasting operation. Silver will be similarly protected.

It will, therefore, be appreciated that, in view of the above disclosure, I have provided a very simple method of obtaining zinc chloride free from its sulphate by utilizing the protective capacity of lead oxide during both a roasting and a chloride leaching operation.

The standard ores contain iron sulphide to a material extent, and in order that the zinc chloride solution may be obtained free from iron chloride, it is desirable to so carry on the roasting operation that the iron sulphide is oxidized to ferric oxide. Then, when the roasted product is leached with the dilute hydrochloric acid, the ferric oxide will not go into solution to a material extent, if a considerable amount of zinc oxide is left in the product being leached, since iron is precipitated from a chloride solution by zinc oxide. This is a simple way of eliminating iron, since the subsequent process hereinafter described will effectively take care of such zinc oxide as is left in the product.

In accordance with this invention, it is not necessary to roast the ore to such an extent as to remove all of the sulphide sulphur, since the residual sulphides may be satisfactorily removed by the subsequent chloridizing steps of the process. To remove the last traces of sulphide sulphur ordinarily requires higher temperatures and results in the formation of refractory or difficultly chloridized compounds, such as zinc ferrate, ferrite or silicate, as well as more complex compounds containing zinc, iron, sulphur and oxygen. By keeping the roasting temperature as low as is feasible for burning off the sulphide sulphur, the formation of such compounds is largely prevented, as well as the undesired sintered condition, which hinders or prevents the penetration of the reagent gases to the ore values. It is highly desirable that the ore be kept in a pulverulent condition throughout the entire process. Various expedients may be employed for this purpose.

The roasted product, or one from which a part of the zinc and copper oxides have been removed, as by the above described leaching operation, may now be chloridized by various procedures which will convert the remaining ore metal oxides and sulphides or other compounds to the chloride form. In the present case, the ore is made up largely of zinc in intimate mixture with lead oxide and sulphate, with or without lead chloride, depending upon whether the product has been preliminarily leached.

My preferred method of chloridizing the roasted or the leached product is to convert the residual zinc oxide to the soluble chloride, such as by means of hydrochloric acid gas and/or chlorine gas or other suitable gaseous reagents, and then to utilize nascent chlorine or such strong chloridizing reagents as ferric chloride for the purpose of solubilizing the sulphides and other refractory compounds. This invention is not limited to the employment of any specific process for this purpose, except as herein claimed; but the preferred procedure involves the treatment of the material in a substantially dry condition throughout the entire chloridizing process. This may involve treating the ore material with hydrochloric acid gas and/or chlorine gas or other suitable gaseous reagent, and preferably with the waste gases from a later stage of the process, under conditions which result in the conversion of the zinc, iron and other oxides to chlorides. Thereafter, the material may be subjected to chlorine gas, with or without the aid of other reagents, to chloridize the residual sulphides, etc.

The preferred procedure is to treat the material in accordance with the disclosure set forth in my prior Patent No. 1,979,281 dated November 6, 1934, wherein the roasted or leached ore is passed progressively through a series of apparatus known as the warm absorber, the cooled absorber and the finisher. In the first or warm absorber, the zinc oxide as well as copper oxide is converted to a chloride by means of the weak gases derived from the finisher and/or the second absorber, which comprise chlorine and hydrochloric acid. After this has been accomplished, the material is passed into the second absorber, in which such ferric oxide as is present is converted to ferric chloride. Thereafter, the material is passed to a third zone or finisher apparatus in which the ore material is heated to a temperature at which the ferric and/or ferrous chloride present is not stable and ore is supplied in sufficient amount to form nascent chlorine and convert the iron oxide to the ferric form, thereby producing the insoluble iron oxide and forming a powerful chloridizing reagent which attacks the difficultly chloridized ingredients of the ore and converts them to chlorides.

The absorbers and finisher may be of suitable construction, such as rotary tubes having baffles on their inner wall which lift the ore material and shower it through the reagent gas; or I may employ a shelf type of apparatus, in which the ore material is passed progressively from one shelf to another below it while it is being agitated and moved across the shelves by means of revolving rake arms.

In the first or warm absorber, if a zinc ore is being treated, the temperature is so controlled and the rate of gas movement through the apparatus is such that sufficient water of reaction, produced by the combination of hydrochloric acid and zinc oxide, will be evaporated and removed from the apparatus, so that the ore material will be kept in a substantially dry condition and the deliquescent zinc chloride will not be permitted to take up enough water from the atmosphere or ore to form a soupy or viscous condition and to cause the ore material to ball up or form lumps which are not easily penetrated by the reagent gases. A suitable temperature is from 80° to 110° C., depending upon the amount of zinc present and the rate of gas flow through the apparatus.

If ferric chloride is to be employed as a reagent in the chloridizing process or as a source of nascent chlorine, then the second chloridizing stage involves the production of crystalline hydrated ferric chloride within the ore material. For this purpose, the ore is provided with sufficient ferric oxide, introduced as iron sulphide initially or as ferric oxide at any suitable stage in the process, so that enough of the reagent will be formed to satisfy the required conditions. In the second absorber, the ore material is subjected to the treatment of strong hydrochloric acid gas, and preferably in the absence of any material amount of air, while the temperature is so controlled, at least at the exit end of the apparatus, that crystalline hydrated ferric chloride will be formed and remain as a stable product in the ore material. The temperature at the exit end may be held at 90° C. or lower to effect the desired result. Owing to the fact that ferric chloride takes up water of crystallization, substantially all of the water formed by the reaction of hydrochloric acid gas on the ferric oxide will be thus absorbed and the ore material will become granular and crystalline in character and will remain substantially dry. Consequently, there is no condensed water on the ore, which will hinder the penetration of the reagent gases. In this process, the ferric chloride, as thus formed, is in intimate association with the refractory compounds of the ore and tends to react directly therewith, and ferrous chloride is thus produced, with the resultant formation of a desired ore metal chloride.

When sufficient iron chloride has been developed in the second absorber, then the ore material may be passed to the finisher where it travels in a counterflow relation to a current of air introduced at the exit end of the apparatus.

The material in this zone is heated rapidly to a temperature at which ferric chloride is not stable, and preferably to a point between 250° and 350° C. or higher for some types of ore, such as 500° C. for a silver bearing ore. The crystalline ferric chloride, when heated initially in the finisher, melts in its water of crystallization and flows into intimate contact with the ore particles, and thus tends to react further therewith. The gas flow through the apparatus is opposed to the direction of ore flow; hence, the water evaporated from the ore is very quickly removed from the chamber. Consequently, the decomposition of the ferrous and/or ferric chlorides takes place in the absence of any large amount of water vapor. Hence, the oxygen of the air attacks the ferric chloride at the higher temperatures and nascent chlorine is evolved and remains as such, and there is only a minimum amount of hydrochloric acid gas formed from the small amount of water vapor present. This procedure insures the formation of the powerful nascent chlorine, instead of the weaker hydrochloric acid gas. Since the gaseous reagent is formed in the nascent condition in intimate association with the ore particles, it attacks the residual sulphides etc. and readily converts them to chlorides. Consequently, this process results in the chloridization of substantially 100% of the desired ore metals.

In accordance with this invention, lead oxide and/or lead chloride are utilized in a protective capacity during these various chloridizing steps; and they are caused to be present in amount sufficient to take up all of the available sulphate radical. If insufficient reagent is present, lead oxide or lead chloride may be added at any suitable chloridizing stage. As above explained, lead oxide and lead chloride react preferentially with the available sulphate radical to form the insoluble lead sulphate, and the zinc and copper are not permitted to form the sulphate, except to a minor extent, during these dry-stage reactions. The lead compound is in intimate association with the ore particles, and such sulphur trioxide as is formed by oxidation of the residual sulphides in the ore is preferentially taken up by the lead, at least to a large extent. It will be understood that the residual ore metal sulphides, when attacked by chlorine gas, tend to form sulphur chloride which in turn is oxidized in the presence of ferric oxide to sulphur dioxide and sulphur trioxide; but owing to lead having a stronger affinity than does zinc for this sulphur trioxide, it is able to protect the latter to a considerable extent from the formation of sulphates.

The finisher product may be assumed to contain lead oxide, lead chloride and lead sulphate in association with the zinc and copper chlorides, ferric oxide and such zinc and copper sulphates as may have been formed. In order to remove the last portion of sulphate radical from the zinc and copper, the next step may involve leaching the finisher product with water or other suitable leaching reagent. During this step, such zinc sulphate as is present will be converted to zinc chloride by the lead chloride in the ore material, with a consequent precipitation from solution of the sulphate radical as lead sulphate. Consequently, a solution of zinc and copper chloride free from the soluble sulphates is thereby formed. The various soluble ore metal chlorides, such as copper and zinc chlorides, may be suitably separated. The residue containing lead sulphate, lead chloride and lead oxide, if present, may be now treated, after the zinc and copper have been removed, to recover the lead therefrom. This may be easily accomplished by leaching the residue with a hot acid-free solution of sodium chloride, which converts the lead sulphate to lead chloride and dissolves all of the lead chloride present. Thereafter, upon cooling, the lead chloride precipitates and is thus recovered. The residue consists of ferric oxide, together with the ore gangue and such other materials as are contained therein.

It will be appreciated that if other chloridizing operations are employed to convert the residual sulphides, oxides etc. to chlorides, lead oxide and lead chloride may be similarly used to prevent the formation of the undesired zinc and other ore metal sulphates. Hence, this invention is not to be considered as limited to the chloridizing procedure above described. If iron is not present in the ore, and if ferric chloride is not needed as a reagent, the treatment of the ore material with chlorine gas may suffice, provided the lead reagent is present to fix the available sulphate radical. The same principle holds good if the roasted ore is treated by aqueous bath methods, such as are involved in chloridizing the residual sulphides by means of ferric, cupric or manganic chloride in solution. In that case, it is desirable to introduce chlorine gas into the aqueous bath containing the finely divided ore material held in suspension, and thus to convert the lower chloride formed by the reaction to the higher chloride for further use in the process. The sulphate radical which is formed by oxidation of the ore metal sulphide is precipitated as lead sulphate in accordance with the above described reaction and is, therefore, removed from the solution. In order to recover the chlorine of the reagent, the ore material, when sufficiently chloridized by the aqueous bath method, may be passed through the finisher apparatus above described, whereby the ferrous and ferric chlorides or other reagents will be forced to give up their combined chlorine and to be converted to the oxide form. Various other procedures will be readily apparent to one acquainted with the art of chloridizing ore metal sulphides, in view of the above disclosure.

It will be appreciated that the lead compound provided for fixing the available sulphate radical as an insoluble compound and hindering or preventing the formation of the sulphate of a desired ore metal may be added either wholly or in part for the purposes of this invention, depending on the nature of the ore being treated; hence the claims are to be interpreted as covering the addition of either a part or all of the lead compound for the purpose specified, it being apparent that one may take into account that amount of any lead compound which is present in the raw ore and then add that further quantity of the same or another lead compound which will satisfy the requirements of the process.

Having thus described the invention, what is claimed as new and desired to secure by Letters Patent is:

1. The method of treating a sulphide ore containing an ore metal which tends to roast to either the oxide or the sulphate comprising the steps of providing an intimate mixture of the ore metal sulphide with a compound of lead added for the purpose which provides a reagent capable of and proportioned for combining with the available sulphate radical during the roasting operation, and roasting the mixture to form a product containing the oxide of the desired ore metal interspersed with lead sulphate.

2. The hydrometallurgical method of recovering ore metal values from a sulphide ore containing a metal which tends to roast to either the oxide or the sulphate comprising the steps of providing an intimate mixture of the ore metal sulphides with a compound of lead added for the purpose which provides a reagent capable of and proportioned for combining during the roasting operation with the available sulphate radical, roasting the mixture under low temperature conditions which prevent the fusion or sintering of the material and result in a pulverulent or friable product which is readily permeated by reagent fluids, thereafter treating the product with a fluid reagent capable of converting ore metal oxides to soluble compounds and recovering the same from the residue.

3. The method of treating a zinc sulphide ore comprising the steps of providing an intimate mixture of the zinc sulphide with a compound of lead added for the purpose which provides a reagent capable of and proportioned for reacting with all of the available sulphate radical during the roasting operation, then roasting the mixture in a pulverulent condition and at a low temperature so as to produce a non-sintered, granular material containing zinc oxide, said lead compound being present in such intimate association with the zinc sulphide that it preferentially takes up the sulphate radical and materially hinders the formation of zinc sulphate, and thereafter converting zinc compounds in the ore material to soluble compounds, dissolving the same and separating the solution from the residue containing the lead compounds.

4. The method of chloridizing a zinc sulphide ore comprising the steps of adding to the ore a lead sulphide concentrate in amount sufficient for combining with the available sulphate radical during the roasting operation, grinding the materials to a finely divided condition and providing an intimate mixture thereof, roasting the mixture with air under low temperature conditions to produce zinc oxide in a non-sintered, finely divided ore material which is permeable to gaseous and liquid reagents, and thereafter chloridizing the ore material to convert residual zinc sulphide and the oxide to chlorides.

5. The method of chloridizing a zinc sulphide ore according to claim 4 comprising the steps of chloridizing the roasted material in the presence of a lead compound which is capable of and is proportioned for combining with the available sulphate radical during the chloridizing operation, whereby the sulphur trioxide formed by oxidation of the sulphide sulphur combines with lead and forms the insoluble lead sulphate, and thereafter dissolving the zinc chloride from the residue containing said lead sulphate.

6. The method of chloridizing an ore material containing a metal sulphide comprising the steps of treating the ore in a substantially dry condition with oxidizing and chloridizing agents and converting said sulphide to a chloride in the presence of a compound of lead added for the purpose which is capable of and proportioned for fixing the available sulphate radical as lead sulphate and thereby minimizing the formation of a sulphate of the ore metal, and thereafter dissolving the ore metal chloride and separating it from the insoluble lead sulphate and ore residue.

7. The method of chloridizing a sulphide ore containing an ore metal which is capable of forming either the chloride or the sulphate during the chloridizing operation comprising the steps of roasting the ore with air to burn off sulphide sulphur and thereafter chloridizing the ore in the presence of a lead compound added for the purpose which is capable of and is proportioned for combining with the available sulphate radical to form lead sulphate and hinder the formation of the sulphate of the desired ore metal, and thereafter dissolving the ore metal chloride from the residue containing said lead sulphate.

8. The method of chloridizing a sulphide ore comprising the steps of roasting the ore with air and providing a roasted product containing a residual sulphide, treating the roasted product with a gaseous chloridizing reagent in the presence of a lead compound added for the purpose which is capable of and proportioned for fixing the available sulphate radical as lead sulphate and forming the desired ore metal chloride, and thereafter dissolving the ore metal chloride and separating it from the ore residue and the lead sulphate.

9. The method of chloridizing a zinc sulphide ore which tends to roast to either the oxide or sulphate comprising the steps of mixing the ore intimately with a lead compound which is capable of and proportioned for fixing the available sulphate radical as lead sulphate during the roasting operation, roasting the ore mixture with air to form zinc oxide and lead sulphate, thereafter treating the product in a substantially dry condition with a gaseous reagent to convert the zinc oxide to a chloride and carrying on the chloridization in the presence of a lead compound added for the purpose which is capable of and is proportioned for fixing the available sulphate radical as the insoluble lead sulphate, and leaching the ore material with a cold aqueous solution of hydrochloric acid and thereby producing a zinc chloride solution substantially free from the sulphate radical.

10. The method of chloridizing a sulphide ore containing a metal which tends to roast to either an oxide or a sulphate comprising the steps of providing an intimate, finely divided mixture of the ore with a compound of lead added for the purpose which provides a reagent capable of and proportioned for combining with the available sulphate radical during the entire roasting and chloridizing operations, roasting the mixture under low temperature and preferably autogenous conditions which result in the formation of a non-sintered, pulverulent material which is permeable to gaseous and liquid reagents, the lead compound being present in such intimate association with the ore metal particles that it reacts preferentially with the available sulphate radical and tends to prevent the formation of sulphates of the desired chloridizable metals, thereafter treating the roasted material with a chloridizing reagent in the presence of a lead compound capable of and proportioned for fixing the available sulphate radical as lead sulphate and causing the formation of the desired ore metal chloride in the presence of the protective lead compound.

11. The method of chloridizing a sulphide ore containing an ore metal which is capable of forming the chloride or sulphate during the process comprising the steps of roasting the ore to remove sulphide sulphur and form an ore metal oxide and thereafter treating the ore material with gaseous chloridizing reagents capable of converting said oxide and residual sulphide to the chloride, and carrying on the chloridizing operation in the presence of the oxide or chloride of lead which is proportioned in amount sufficient to react with the available sulphate radical and form the insoluble lead sulphate and materially hinder the formation of the sulphate of the desired ore metal, said lead oxide or chloride being derived from a reagent added for the purpose of causing said protective action, and thereafter dissolving the ore metal chloride and thus separating it from the residue containing said lead sulphate.

12. The method of claim 2 in which the roasted ore is thereafter leached with a cold hydrochloric acid solution in the presence of lead oxide or chloride which is proportioned in amount sufficient to insure that any ore metal sulphate present is converted to the chloride.

13. The method of treating a zinc sulphide ore according to claim 3 in which the roasted ore containing zinc oxide and zinc sulphate is leached with a cold hydrochloric acid solution in the presence of sufficient lead oxide or chloride to insure the conversion of zinc sulphate to zinc chloride and the precipitation of the sulphate radical as lead sulphate which goes with the residue.

14. The method of treating a complex zinc and iron sulphide ore according to claim 3 in which the roasted ore is leached with a cold solution of hydrochloric acid in the presence of sufficient lead oxide or chloride to fix the available sulphate radical as lead sulphate and in which the leaching operation is carried on to such an extent that sufficient zinc oxide is left in the ore material to prevent the formation of soluble iron chloride, whereby a zinc chloride solution is obtained substantially free from its sulphate and soluble lead and iron compounds.

15. The method of claim 11 in which the chloridized ore material is leached with water in the presence of sufficient lead chloride to remove the ore metal chloride in solution and transpose to the chloride any ore metal sulphate there present, with the resultant formation of the insoluble lead sulphate.

16. The method according to claim 2 in which the ore is roasted in the presence of sufficient ferric oxide and inert materials in pulverulent condition and while being thoroughly agitated so as to insure the production of a product which is permeable to fluids, and in which the ore material is thereafter treated with chloridizing agents to form a desired ore metal chloride and leave ferric oxide in the residue.

17. The method of claim 10 in which the lead compound is present in amount sufficient to form residual lead chloride during the chloridizing step, and the product is leached with water to form an aqueous solution of the ore metal chloride in the presence of said lead chloride, whereby any ore metal sulphate in solution will be converted to the chloride, with the resultant formation of the insoluble lead sulphate, and thereby forming an ore metal chloride solution which is substantially free from its sulphate.

THOMAS A. MITCHELL.